(12) United States Patent
Webb et al.

(10) Patent No.: US 10,594,838 B2
(45) Date of Patent: Mar. 17, 2020

(54) CONFIGURATION DATA AS CODE

(71) Applicants: Jason Michael Webb, San Marcos, CA (US); Amit Ramchandra Jere, San Diego, CA (US); Karen Lynn Fraser, Encinitas, CA (US); Amit Rohatgi, San Diego, CA (US); Puja Baid, Seattle, WA (US); Thomas Barnes, San Diego, CA (US)

(72) Inventors: Jason Michael Webb, San Marcos, CA (US); Amit Ramchandra Jere, San Diego, CA (US); Karen Lynn Fraser, Encinitas, CA (US); Amit Rohatgi, San Diego, CA (US); Puja Baid, Seattle, WA (US); Thomas Barnes, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 608 days.

(21) Appl. No.: 15/143,497

(22) Filed: Apr. 29, 2016

(65) Prior Publication Data
US 2017/0318124 A1    Nov. 2, 2017

(51) Int. Cl.
*H04L 29/08* (2006.01)
*H04L 12/24* (2006.01)
*H04L 29/06* (2006.01)

(52) U.S. Cl.
CPC .......... *H04L 67/34* (2013.01); *H04L 41/0803* (2013.01); *H04L 41/0843* (2013.01); *H04L 41/0846* (2013.01); *H04L 67/10* (2013.01); *H04L 63/10* (2013.01)

(58) Field of Classification Search
CPC ...................................................... H04L 29/08
USPC ......................................................... 709/220
See application file for complete search history.

(56) References Cited

U.S. PATENT DOCUMENTS

2016/0234108 A1* 8/2016 McAleer ............. H04L 41/0853
2016/0299771 A1* 10/2016 Navarro .................. G06F 17/50

FOREIGN PATENT DOCUMENTS

| EP | 2890052 A1 | 7/2015 | |
| WO | 03/032176 A1 | 4/2003 | |
| WO | WO 03032176 A1 * | 4/2003 | ............. H04L 29/06 |

OTHER PUBLICATIONS

PCT Invitation to Pay Additional Fees and Partial International Search Report for PCT/US2017/030431, dated Sep. 15, 2017, 11 pages.

* cited by examiner

*Primary Examiner* — Vivek Srivastava
*Assistant Examiner* — Sibte H Bukhari
(74) *Attorney, Agent, or Firm* — Ferguson Braswell Fraser Kubasta PC

(57) ABSTRACT

A method is provided for providing services gateway configuration data. The method includes receiving, from a services gateway, a request for configuration data. Also, the method includes identifying a first subset of stored configuration data that is responsive to the request. The first subset of the stored configuration data is identified using a content of the request and a state of the first subset of the stored configuration data. Additionally, the method includes sending, to the services gateway, the first subset of the stored configuration data.

8 Claims, 7 Drawing Sheets

CONFIGURATION DATA AS CODE

CROSS-REFERENCE TO RELATED APPLICATIONS

This application is related to U.S. patent application Ser. No. 15/143,489, filed Apr 29, 2016, entitled "MONITORING OF APPLICATION PROGRAM INTERFACE INTEGRATIONS"; and U.S. patent application Ser. No. 15/143,492, filed Apr. 29, 2016, entitled "GATEWAY POLICY ENFORCEMENT AND SERVICE METADATA BINDING".

BACKGROUND

A services gateway may be configured to enforce many different policies. The policies may include different authentication types, authorization rules, throttling rules, and/or and traffic swimlanes. The policies enforced for a given client request received at the services gateway may be controlled by a service configuration stored within a services registry. In other words, the services gateway enforces policies based on data of the services registry. The process of generating, testing, and activating policies can be cumbersome and error-prone, requiring both pre-production and production registries, as well as a workflow that includes importing/exporting policy configurations between the two types of registries, and may require a stage to modify variable names in an exported configuration.

SUMMARY

In general, in one aspect, the invention relates to a method for providing services gateway configuration data. The method includes receiving, from a services gateway, a request for configuration data. Also, the method includes identifying a first subset of stored configuration data that is responsive to the request. The first subset of the stored configuration data is identified using a content of the request and a state of the first subset of the stored configuration data. Additionally, the method includes sending, to the services gateway, the first subset of the stored configuration data.

In general, in one aspect, the invention relates to a system for providing services gateway configuration data. The system includes a hardware processor and memory. Also, the system includes software instructions stored in the memory. The software instructions are configured to execute on the hardware processor, and, when executed by the hardware processor, cause the hardware processor to receive, from a services gateway, a request for configuration data. Also, when executed by the hardware processor, the software instructions cause the hardware processor to identify a first subset of stored configuration data that is responsive to the request. The first subset of the stored configuration data is identified using a content of the request and a state of the first subset of the stored configuration data. Additionally, when executed by the hardware processor, the software instructions cause the hardware processor to send, to the services gateway, the first subset of the stored configuration data.

In general, in one aspect, a method is provided for providing services gateway configuration data. The method includes storing an instance of services gateway configuration data. The method also includes storing a flag in association with the instance of services gateway configuration data. Additionally, the method includes preventing access, by a services gateway, to the instance of services gateway configuration data based on the flag.

Other aspects of the invention will be apparent from the following description and the appended claims.

DETAILED DESCRIPTION

Figure 1A:
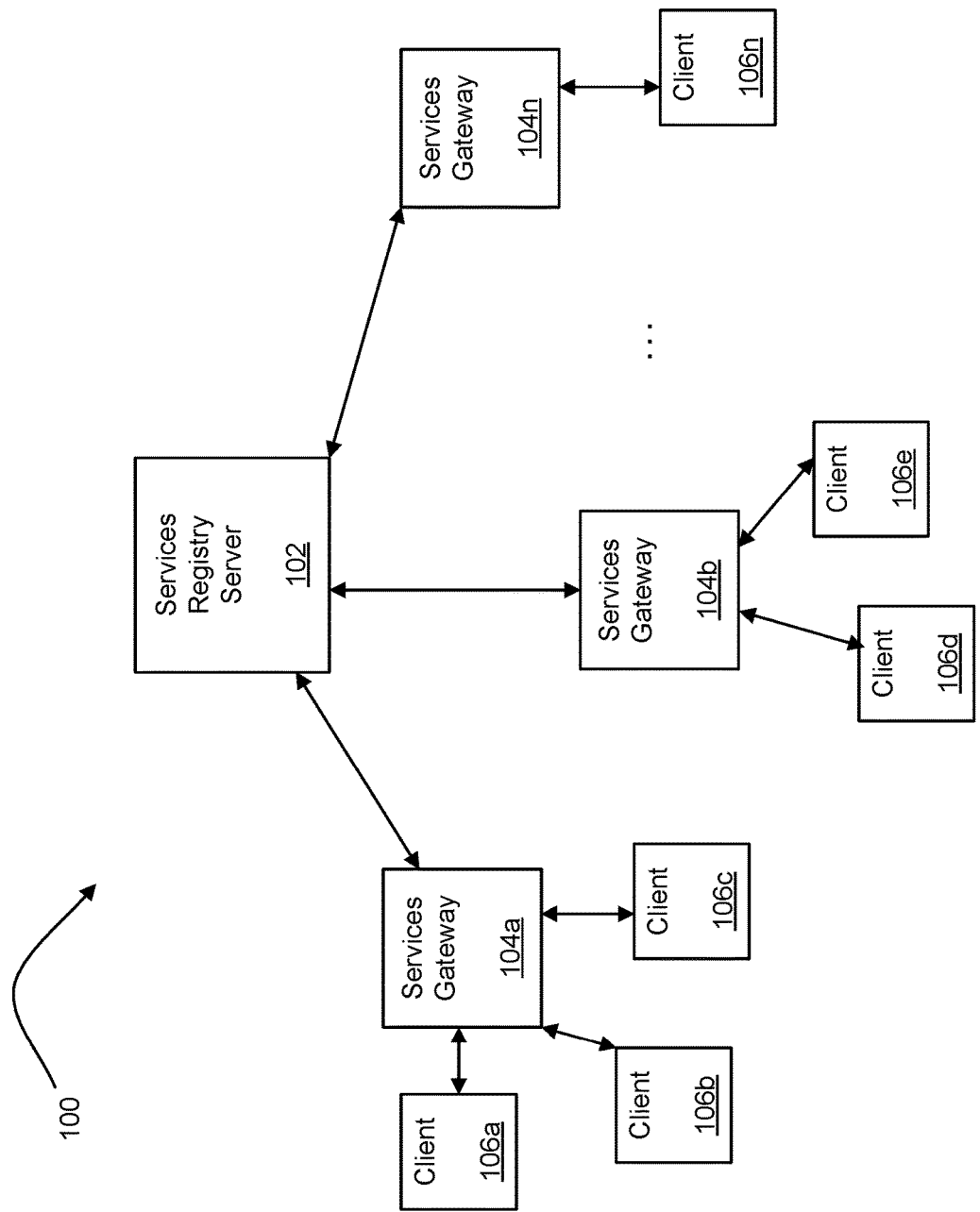
FIGS. 1A and 1B show schematic diagrams of a system for deploying configuration data as code, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a computer readable medium for deploying configuration data as code. The following description provides methods, systems, and computer program products for staging pre-production services gateway configuration data on production services gateways in a manner that allows the configuration data to be tested in a safe and comprehensive manner, and thereafter rapidly transitioned to active configuration data without further modification of the configuration data. Further, as described in more detail below, the transitioning of the configuration data avoids the exportation of the configuration data between physical devices, and allows for the integration of pre-production and production services registries on a single device.

FIG. 1A shows a schematic diagram of a system (100) for deploying configuration data as code, in accordance with one or more embodiments of the invention. The system (100) includes a services registry server (102) in communication with one or more services gateways (104), where the services gateways (104) are in communication with one or more clients (106), in accordance with one or more embodiments of the invention. More specifically, FIG. 1A shows the services registry server (102) in communication with a first services gateway (104a), a second services gateway (104b), and a third services gateway (104n), in accordance with one or more embodiments of the invention. Moreover, FIG. 1A shows the first services gateway (104a) in communication with a first client (106a), a second client (106b), and a third client (106c); the second services gateway (104b) in communication with a fourth client (106d) and a fifth client (106e); and the third services gateway (104n) in communication with a sixth client (106n).

As described herein, in accordance with one or more embodiments of the invention, communications between the services registry server (102) and the services gateways (104), and between the services gateways (104) and the clients (106), may occur via one or more computer networks to which the registry server (102), the services gateways (104), and the clients (106) are coupled. For example, the computer network(s) may include wired and/or wireless portions of public and/or private data networks, such as wide area networks (WANs), local area networks (LANs), the Internet, etc.

For purposes of simplicity and clarity, the system (100) is shown in FIG. 1A to include a single instance of the services registry server (102), three services gateways (104), and six clients (106). However, it is contemplated that the system (100) may include multiple services registry servers (102). As an option, in systems including multiple services registry servers (102), there may be a single logical services registry that is distributed such that the logical services registry is stored on multiple physical services registry servers (102). Moreover, it is contemplated that the system (100) may include any number greater than or less than three services gateways (104), and/or any number greater than or less than six clients (106).

As described herein, in accordance with one or more embodiments of the invention, each of the clients (106a-106n) includes software and/or hardware that sends requests to one or more of the services gateways (104a-104n). For example, each of the clients (106a-106n) may include a desktop computer, portable computer (e.g., laptop, netbook, etc.), or mobile device (e.g., tablet computer, cellular phone, smartphone, etc.), etc. Moreover, each of the clients (106a-106n) may include executing thereon one or more applications. As an option, an application may include a financial management application, such as accounting software or tax software. A request from one of the clients (106) may include a message requesting access to one or more resources offered via the service gateways (104). For example, the request may include a GET request for retrieving data from a service, a PUT request for storing data to a service, etc. As an option, an application executing at one or more of the clients (106) may be operating in response to user inputs received, for example, via a user interface at the client (106). Still yet, a request from one of the clients (106) may be sent in response to user input received at the respective client (106). For example, a first services gateway (104a) may receive a request from accounting software executing on a first client (106a), and a second services gateway (106b) may receive a request from tax software executing on a second client (106d).

As described herein, in accordance with one or more embodiments of the invention, each of the services gateways (104a-104n) includes software and/or hardware for receiving requests from clients (106), and responding to the requests in accordance with configuration data received from the services registry server (102). As noted above, a request from a client (106) may include a message requesting action or access with respect to one or more resources offered via the service gateways (104). In other words, the clients (106) may access remotely hosted resources (e.g., services, applications, data, etc.) via the services gateways (104). Moreover, the services gateways (104) may control access to the remotely hosted resources based on configuration data received from the services registry (102). Thus, the services gateways (104) may permit or reject access, by the clients (106), to remotely hosted resources based on configuration data that originates from the services registry server (102), as described in more detail below.

As described herein, the services registry server (102) includes software and/or hardware that stores a services registry. The services registry includes a repository storing configuration data for use by each of the services gateways (104a-104n). In one or more embodiments, the configuration data of the services registry may include metadata, such as security metadata. In one or more embodiments, the services registry server (102) provides the configuration data stored within its services registry to the services gateways (104), as described in more detail below.

Figure 1B:
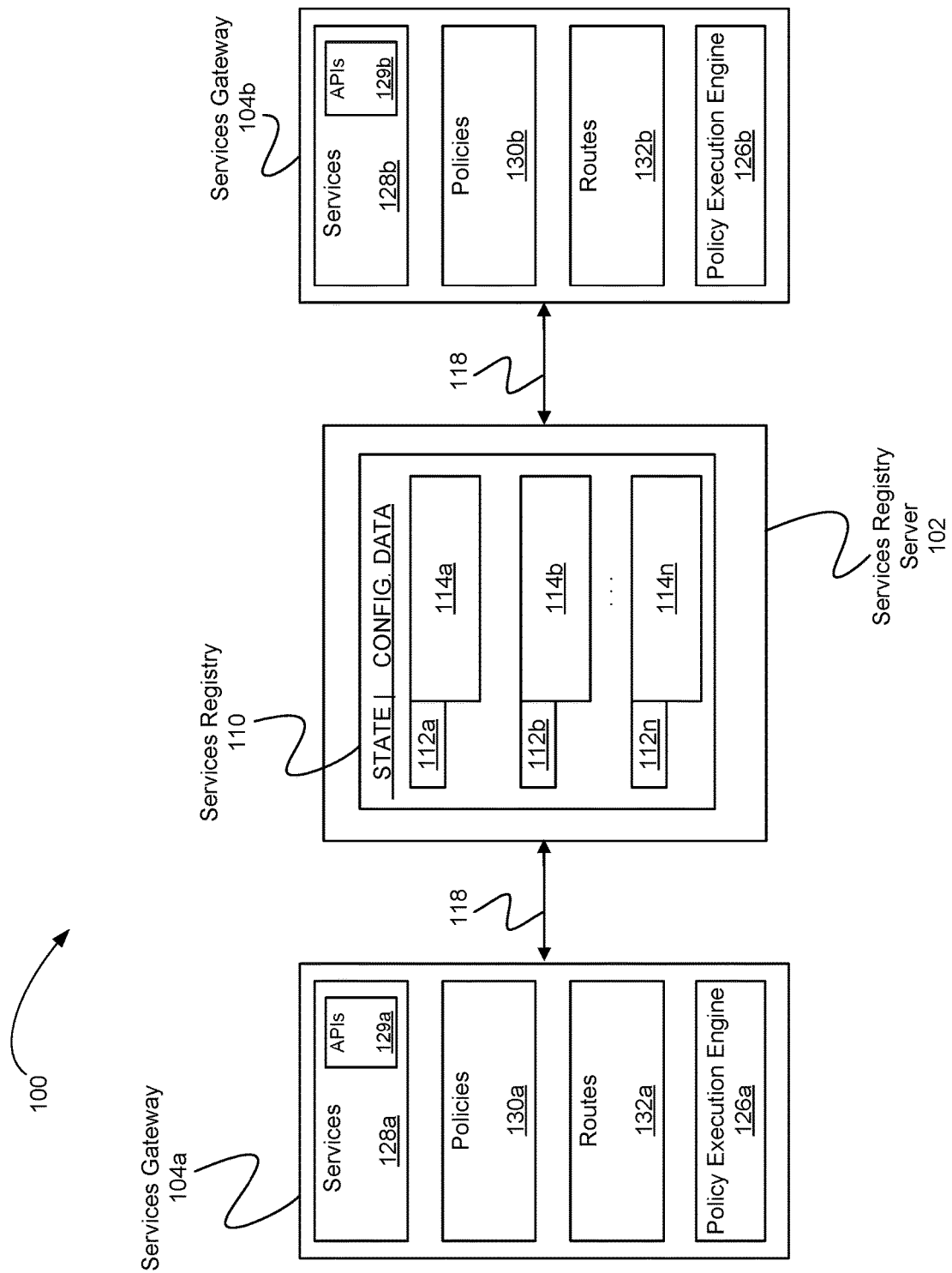

Referring now to FIG. 1B, another schematic diagram is shown of the system (100) for deploying configuration data as code, in accordance with one or more embodiments of the invention. Specifically, FIG. 1B illustrates in more detail a services registry server (102), services gateways (104), and a computer network (118) therebetween.

As shown in FIG. 1B, in accordance with one or more embodiments of the invention, each of the services gateways (104a-104b) are illustrated to include a services pool (128), a policies pool (130), a routes pool (132), and a policy execution engine (126). More specifically, a first services gateway (104a) is illustrated to include a first services pool (128a), a first policies pool (130a), a first routes pool (132a), and a first policy execution engine (126a); and a second services gateway (104b) is illustrated to include a second services pool (128b), a second policies pool (130b), a second routes pool (132b), and a second policy execution engine (126b).

In one or more embodiments, each of the services pools (128a-128b) may include various discrete services. As used herein, a service includes any resource accessible for use over a network. As an option, one or more of the services may be utilized by an application developed by a first party, second party, or third party application developer. In one or more embodiments, the services of the services pools (128) may include any combination of platforms, software applications, and/or processes. For example, each of the services pools (128a-128b) may include any combination of one or more identity services, one or more document services, one or more routing services, one or more commerce services, one or more data access services or platforms, one or more financial management applications (e.g., accounting platforms, tax management platforms, etc.), and one or more data exchange services.

As shown in FIG. 1B, in accordance with one or more embodiments of the invention, each of the services pools (128a-128b) include a corresponding application program interfaces (API) pool (129a-129b). More specifically, the first services pool (128a) includes a first API pool (129a), and the second services pool (129a) includes a second API pool (129a). In one or more embodiments, each of the API pools (129a-129b) may include various discrete APIs. Moreover, each of the APIs may be associated with a particular service of the services pool (128) in which it resides. Each API in the API pools (129) may include a set of remote calls for accessing data the service it is associated with in the services pool (128). For example, if the second services pool (128b) includes an identity service, then the second API pool (129b) may include one or more methods for calling the identity service to validate a device or user utilizing the identity service. Similarly, if the first services pool (128a) includes a document service, then the first API pool (129a) may include one or more methods for calling the document service to store, delete, or modify a file, folder, or object.

In one or more embodiments, the services in a services pool (128) may call each other. For example, a given service of the first services pool (128a) may call another service in the first services pool (128a) using an API in the first API pool (129b) that is associated with the other service. As an option, services may call services that reside on another services gateway (104). Such calls may be communicated via a computer network. For example, using an API in the first API pool (129a), a given service residing in the second services pool (128b) of the second services gateway (104b) may call a service that is associated with the API in the first API pool (129a), and resides in the first services pool (128a) of the first services gateway (104a).

In one or more embodiments, each of policies pool (130a-130b) may include various discrete policies. As used herein, a policy includes any information that defines how to, and/or is used to, determine whether to grant or deny a client access to a resource. For example, when a client (i.e., a client (106) as described in FIG. 1A) has requested access to a service of a services pool (128) in a request received at a services gateway (104), one or more policies of the policies pool (130) at the services gateway (104) may be utilized for determining whether to grant or deny the client access to the requested service. Each of the policies may include, for example, an authentication type, an authorization rule, a throttling rule, a traffic swimlane, etc.

In one or more embodiments, each of the routes pools (130a-130b) may include various discrete routes. As used herein, a route is a path through a services gateway (104). In one or more embodiments, each route includes a Uniform Resource Identifier (URI) pattern. The URI pattern of a given route may define a request path for the route. In one or more embodiments, each route may include a URI pattern and one or more attributes associated with the URI pattern. An attribute associated with a URI pattern may include information that describes a quality, feature, characteristic, and/or property of the URI pattern.

As an option, in accordance with one or more embodiments of the invention, one or more routes in a routes pool (132) of a services gateway (104) may be bound to one or more of the policies in the policies pool (130) of the services gateway (104). As a consequence of binding a route to a policy, it may be required that the policy executes successfully against any request to access a service on the route. For example, a given route in the second routes pool (132b) of the second services gateway (104b) may be bound two different policies in the second policies pool (130b) of the second services gateway (104b). As a result of such binding, in order for a client to access a service on the given route, both of the bound policies must execute successfully against the client, and/or the client's request, prior to the client accessing the service. If the policies do not successfully execute, then access may be denied.

In one or more embodiments, each of the policy execution engines (126a-126b) include a process executing on the respective services gateway (104a or 104b) that executes policies against requests received from clients.

In one or more embodiments, the policies of the policies pool (130) of a services gateway (104) executed against a request received at the services gateway (104) may be identified based on a content of the request. For example, a particular request may specify a path to a requested resource. The policy execution engine (126) at the services gateway (104) may execute one or more policies in the policies pool (130) of the services gateway (104) against the request in order to determine whether the request can be fulfilled. The policies executed against the request may be identified based on a route identified to match the path in the request. More specifically, the particular policies executed against the request may be identified and executed against the request because the policies are bound to the route that matches the path in the request.

Additionally, as illustrated by FIG. 1B, the services registry server (102) includes a services registry (110), in accordance with one or more embodiments of the invention. Further, the services registry (110) stores one or more instances of configuration data (114). Specifically, as illustrated in FIG. 1B, the services registry (110) includes first configuration data (114a), second configuration data (114b), and third configuration data (114n). As used herein, an instance of configuration data (114) is any portion of independent configuration data (114) in the services registry (110) that is made active or made inactive by a single action or command.

In one or more embodiments, the configuration data (114) may include policy annotations. A policy annotation includes metadata that describes a policy. Accordingly, policy annotations in the configuration data (114) may include metadata describing one or more authentication protocols, describing one or more throttling processes, describing one or more authorization protocols, etc. As one example, policy annotations in the configuration data (114) may describe the OAuth1, OAuth2, etc., authentication protocols.

The policies within a policies pool (130) of a services gateway (104) may be annotated based on the configuration data (114) of the services registry (110). In this way, policy annotations in the configuration data (114) may describe the different mechanisms that may be available to a services gateway (104) for enforcement against a request from a client, or for otherwise enhancing a request from a client.

In one or more embodiments, the configuration data (114) may include data bindings, in accordance with one or more embodiments of the invention. A data binding includes metadata that identifies a binding between a policy in a policies pool (130) of a services gateway (104) and a route in the routes pool (132) of the services gateway (104). Accordingly, the data bindings may specify target routes to which one or more policies, as described in the policy annotations, should be bound.

For purposes of simplicity, the services registry (110) is described herein as storing the three instances of configuration data (114a, 114b, 114c), and three corresponding state flags (112), however it is understood that the services registry (110) may contains hundreds, thousands, hundreds of thousands, etc. instances of configuration data (114), where each instance of the configuration data (114) may be associated with a respective state flag (112).

In one or more embodiments, one or more instances of configuration data (114) are received from the services registry server (102) by a services gateway (104) over the computer network (118). As an option, a given services gateway (104) may receive only a subset of the configuration data (114) stored in the services registry (110). For example, the first services gateway (104a) may receive the first configuration data (114a) and the third configuration data (114n) from the services registry (110). Further, the second services gateway (104b) may receive only the second configuration data (114b) from the services registry (110). Mechanisms and methods used to determine the subset of configuration data (114) provided to a given services gateway (104) are described in more detail below.

In one or more embodiments, the configuration data (114) is retrieved from the services registry (110) by a services gateway (104) when the services gateway (104) is initialized. Accordingly, when a given services gateway (104) is initialized, the services gateway (104) may retrieve (e.g., via the computer network 118, etc.) policy annotations, data bindings, etc. from the services registry (110). The retrieval by the services gateway (104) may include the services gateway (104) requesting the configuration data (114) from the services registry server (102). The initialization of the services gateway (104) may include, for example a startup process. In one or more embodiments, after a services gateway (104) has retrieved the configuration data (114), the services gateway (104) may utilize any retrieved configuration data (114) for configuring the operation of the services gateway (104). For example, the services gateway may expose services, and configure routes and policies based on the configuration data (114) that it has received. As an option, after receiving the configuration data (114), the services gateway (104) may annotate different portions of code in the policies pool (130). Moreover, after receiving the configuration data (114), the services gateway (104) may bind one or more policies to one or more routes.

In one or more embodiments, each instance of the configuration data (114a-114n) may be associated with a state. The state of a given instance of the configuration data (114) may be determined utilizing a flag (112) associated with the instance of configuration data (114). For example, as illustrated in FIG. 1B, the first configuration data (114a) is shown associated with a first state flag (112a), the second configuration data (114b) is shown associated with a second state flag (112b), and the third configuration data (114n) is shown associated with a third state flag (112n). In other words, each of the flags (112) indicates a state of the configuration data (114) with which the flag (112) is associated.

In one or more embodiments, each of the flags (112a-112n) may be set by selecting a value of the flag from one or more pre-determined values, where each of the values is representative a different state. In other words, each of the flags (112a-112n) may be representative of a different pre-determined state. For example, a first value may be representative of a first state, a second value representative of a second state, a third value representative of a third state, etc. In this way, the first flag (112a) may indicate that the first configuration data (114a) is in a first state, the second flag (112b) may indicate that the second configuration data (114b) is in a second state, and the third flag (112n) may indicate that the third configuration data (114n) is in a third state.

As another example, both the first flag (112a) and the third flag (112n) may have the same value, thereby indicating that the first configuration data (114a) and the third configuration data (114n) are in the same state. As described herein, all instances of configuration data (114) having the same state may be considered a subset of configuration data. Accordingly, configuration data (114) of the services registry (110) may be broken into multiple subsets of configuration data, where all instances of configuration data (114) in a given subset are associated with the same state. In this way, the state of a first subset of the configuration data (114) is configured using a flag that is associated with the first subset of the configuration data (114).

In one or more embodiments, a first value of a given state flag (112) may indicate that the configuration data (114) associated with the flag (112) is in an edit state, a second value of the given state flag (112) may indicate that the configuration data (114) associated with the flag (112) is in a pending or validated state, and a third value of the given state flag (112) may indicate that the configuration data (114) associated with the flag (112) is in an active state.

As used herein, an edit state indicates that the associated configuration data (114) is being edited. For example, configuration data (114) that is flagged as in an edit state may be in the process of being written, re-written, or modified in some other manner by an engineer, programmer, etc.

Moreover, in accordance with one or more embodiments of the invention, a pending or validated state indicates that a decision is currently being made regarding whether the associated configuration data (114) is fit for deployment in a production environment. Configuration data (114) in a pending or validated state may be awaiting testing, or may have already undergone testing. Thus, configuration data (114) in a pending or validated state may not be visible to a services gateway that is handling clients' requests in a production environment.

Still yet, an active state indicates that the associated configuration data (114) is fit for deployment in a production environment. For example, when an instance of configuration data (114) is in an active state, that configuration data (114) may be visible to services gateways (104) that are responding to client requests from customers. The customers may include individuals that pay for access to a platform served by the services gateways (104). For those customers, the availability and security of the platform may be of the utmost importance. Accordingly, an instance of configuration data (114) may be not be flagged as in an active state until after one or more tests have been satisfactorily completed while the instance of configuration data (114) was in the pending or validated state.

In one or more embodiments, all instances of the configuration data (114) that are in an edit state may include a first subset of configuration data, all instances of the configuration data (114) that are in a pending or validated state may include a second subset of configuration data, and all instances of the configuration data (114) that are in an active state may include a third subset of configuration data.

As previously noted, in one or more embodiments, a given services gateway (104) may receive only a subset of all the configuration data (114) stored in the services registry (110) of the services registry server (102) in response to a request. For example, the services registry server (102) may restrict the access of a given services gateway (104) to a subset of configuration data (114) in the services registry (110) such that the services gateway (104) is only able to access the instances of configuration data (114) that are associated with the same single state (i.e., edit, pending or validated, or active).

Thus, in accordance with one or more embodiments of the invention, the subset of configuration data (114) provided to a given services gateway may depend on a state of each instance of the configuration data (114a-114n) in the services registry (110). In one or more embodiments, the subset of configuration data (114) provided to a given services gateway (104) may depend a content of the request sent by the services gateway (104) requesting the configuration data. In this way, and as described in more detail below, the system of FIGS. 1A-1B enables a single services registry server (102) to provide the appropriate configuration data (114) to both production and pre-production services gateways (104). Moreover, in accordance with one or more embodiments of the invention, the system of FIGS. 1A and 1B enables the single services registry server (102) to seamlessly transition instances of the configuration data (114) from a test state where the instance is only available to pre-production services gateways (104), to an active state where the instance is available to production services gateways (104), without requiring the export of data or updates to variables.

Figure 2A:
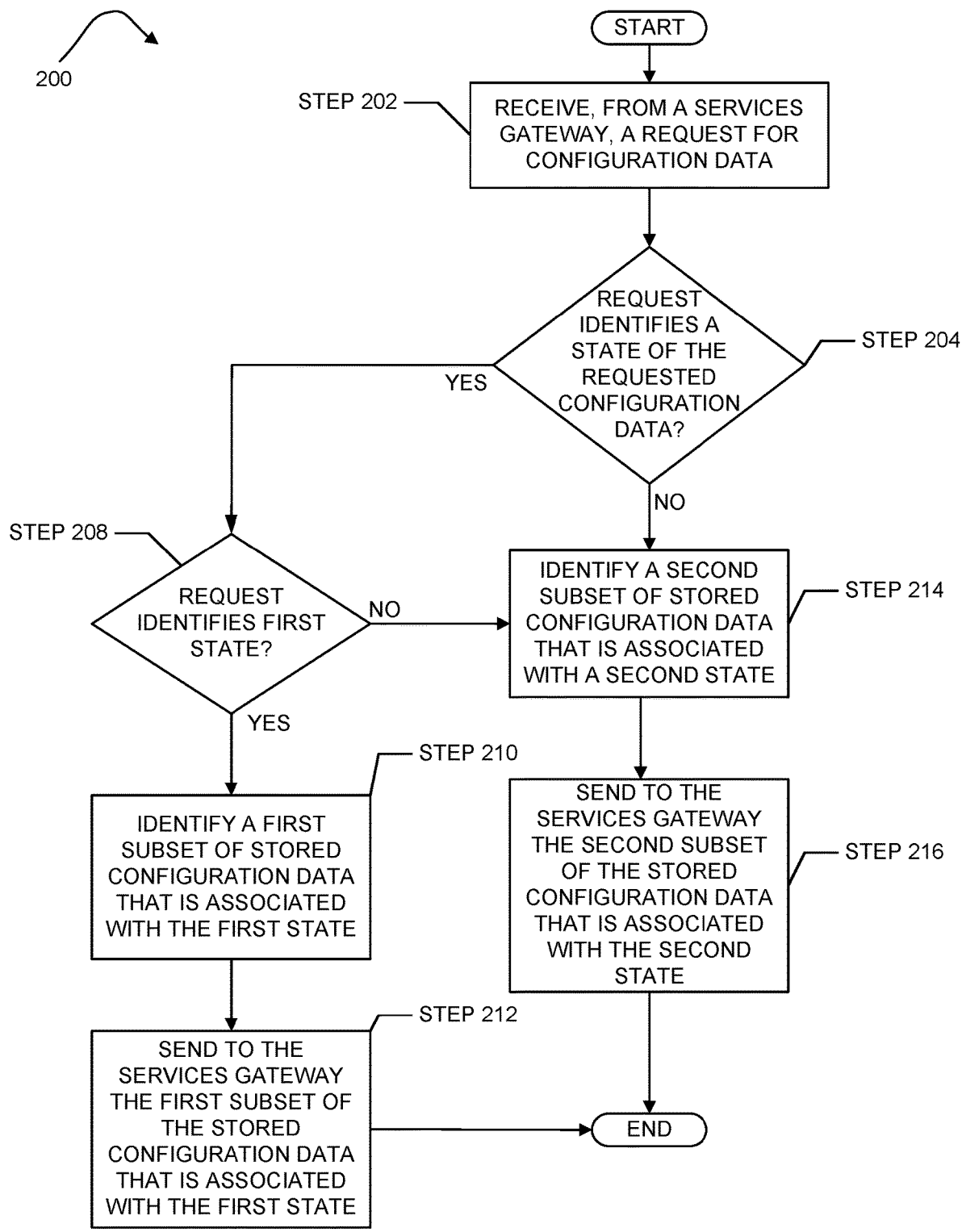
FIGS. 2A, 2B, and 2C show flowcharts of methods for deploying configuration data as code, in accordance with one or more embodiments of the invention.

FIG. 2A depicts a flowchart of a method (200) for deploying configuration data as code, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using a services registry server (102) of the system (100) described in reference to FIGS. 1A and 1B, above, and/or involving the computing system (400) described in reference to FIG. 4A.

As shown in FIG. 2A, at Step 202, a request for configuration data is received from a services gateway. In one or more embodiments, the request may be received via a network. For example, the configuration data may be received via the Internet, a local area network (LAN), a wide area network (WAN), or a virtual private network (VPN). In one or more embodiments, the request for configuration data may be received from the services gateway during an initialization process of the services gateway. For example, the services gateway may send the request for the configuration data during a startup process, a restart, etc.

Next, at Step 204, it is determined whether the request from the services gateway identifies a state of the requested configuration data. As described above, the services registry server that receives the request may store hundreds, thousands, or more of instances configuration data for various services gateway. Moreover, each instance of configuration data may be associated with flag that identifies the state of the corresponding configuration data. Accordingly, at Step 204, the services registry server may determine whether the received request specifically identifies any states that are associated with the configuration data being stored by the services registry server. For example, the request may specify one of an active state, a pending or validated date, or an edit state. In this way, the services gateway that transmitted the request may explicitly request configuration data of a specific state. In one or more embodiments, the services gateway may be configured, as a default, to specify an active state in its requests.

If, at Step 204, it is determined that the request identifies a state, then, at Step 208, it is determined whether the request identifies a first state. In one or more embodiments, the state identified by the request may be determined by analyzing a content of the request. For example, the state may be identified in a message, a message header, etc. In other words, the request may, in some manner, explicitly identify the first state.

In one or more embodiments, the services registry server may store numerous instances of configuration data, where each instance is associated with one of two or more different states. The first state may be a pre-determined state that is based on the system in which the method (200) is being performed. For example, the first state may be a state associated with configuration data that is not ready for a production environment (i.e., the edit state, the pending or validated date, etc.). Thus, the subset of configuration data on the services registry server that is associated with the first state may currently be under development or testing by developers or engineers.

Accordingly, if it is determined at Step 208 that the request does not explicitly request the first state or it is determined at Step 204 that the request does not identify any state of the request configuration data, then, at Step 214, a second subset of stored configuration data that is associated with a second state is identified. In one or more embodiments, the second state may be the state associated with configuration data that is visible to production services gateways, and therefore can be deployed to a production environment (i.e., the active state). In other words, in one or more embodiments, if the services gateway fails to specify a state in the request, then, by default, the services registry server may return to the services gateway the subset of configuration data that is associated with the active state.

In one or more embodiments, the second subset of stored configuration data may be identified by examining all configuration data available in the services registry, and selecting any configuration data that is associated with the second state. In other words, the second subset of configuration data may include all instances of configuration data stored in the services registry that are associated with the second state.

Moreover, at Step 216, the second subset of stored configuration data is sent to the services gateway from which the request was received (at Step 202). In this manner, a services registry server hosting configuration data associated with various different states may, using state flags and a content of the request, prevent the transmission of pre-production configuration data to a services gateway that hasn't explicitly requested the pre-production configuration data.

However, if, at Step 208, it is determined that the request identifies the first state, then, at Step 210, a first subset of stored configuration data that is associated with the first state is identified. In one or more embodiments, the subset of stored configuration data associated with the first state may be identified by examining all configuration data available in the services registry, and selecting any configuration data that is associated with the first state. In other words, the first subset of configuration data may include all instances of configuration data stored in the services registry that are associated with the first state. Of course, the configuration data of the services registry server may be filtered in any manner to arrive at the first subset of stored configuration data that is associated with the first state.

In this manner, the first subset of stored configuration data that is responsive to the request, due to being associated with the first state, is identified using a content of the request and a state of the stored configuration data as identified using state flags. As an example, all configuration data flagged as in the first state may be configuration data that is currently being developed, tested, validated, etc., and should not be visible to production services gateways.

Moreover, at Step 212, the first subset of stored configuration data is sent to the services gateway from which the request was received (at Step 202). In this manner, a services registry server hosting configuration data associated with various different states may, using state flags and a content of a request, ensure that pre-production configuration data is only transmitted to a services gateway that has explicitly requested the pre-production configuration data.

Figure 2B:
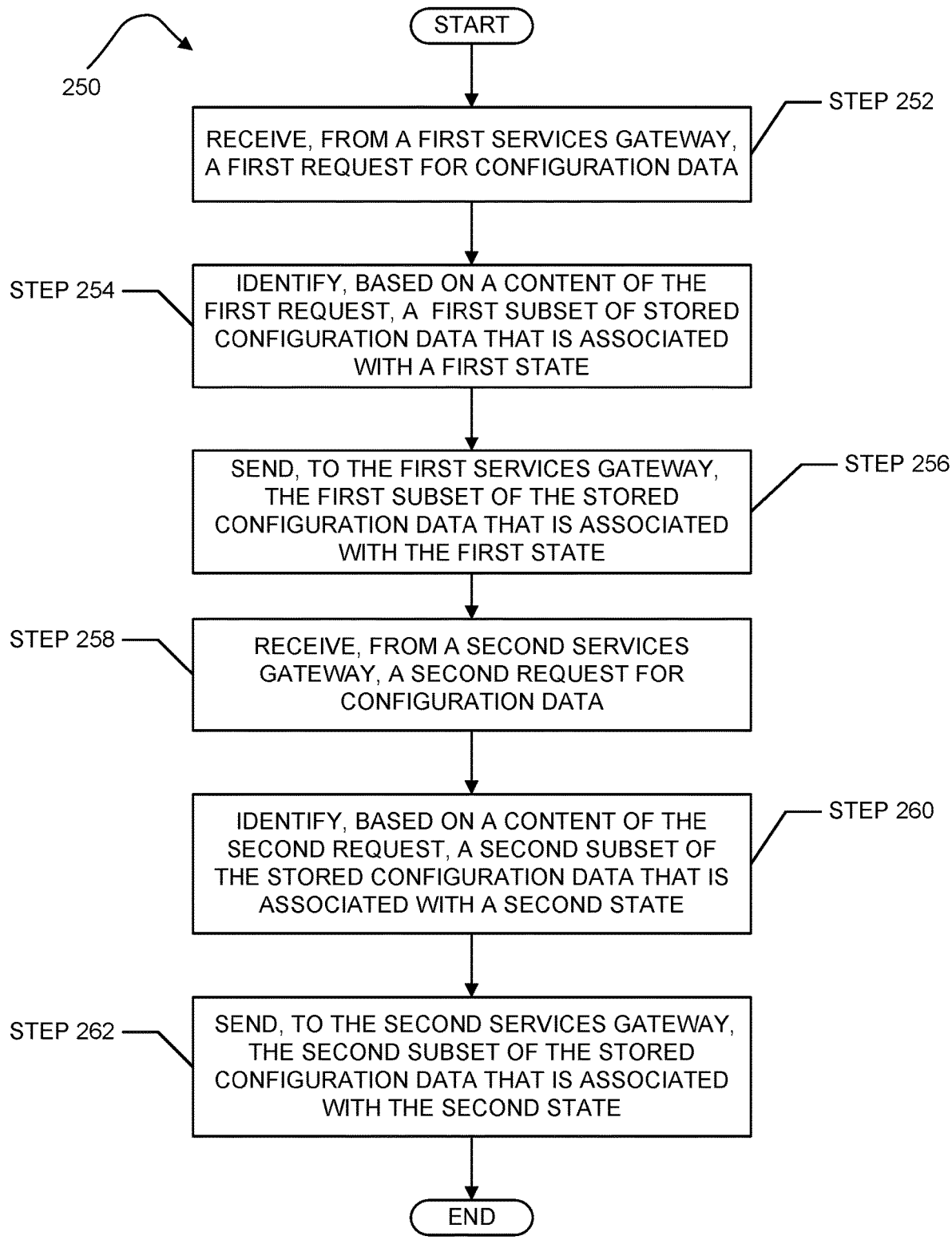

FIG. 2B depicts a flowchart of a method (250) for deploying configuration data as code, in accordance with one or more embodiments of the invention. In one or more embodiments, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method (250) described in reference to FIG. 2B may be practiced using the services registry server (102) of the system (100) described in reference to FIGS. 1A-1B, above, and/or involving the computing system (400) described in reference to FIG. 4A.

A first request for configuration data is received, from a first services gateway, at Step 252. As previously noted, the first request for configuration data may be received via a network. Moreover, based on a content of the first request, a first subset of stored configuration data that is associated with a first state is identified at Step 254. As described previously, in the context of Steps 208-212 of FIG. 2A, the first state may be a pre-determined state that is based on the system in which the method (250) is being performed. For example, the pre-determined state may be a state associated with configuration data that is not ready for a production environment (i.e., the edit state, the pending or validated state, etc.). Thus, the first subset of configuration data on the services registry server that is associated with the first state may currently be under development or testing by developers or engineers.

Moreover, at Step 256, the first subset of stored configuration data is sent to the first services gateway from which the request was received (at Step 252). The operations performed at Step 256 may be substantially identical to the operations performed at Step 212, as described in the context of the method (200) of FIG. 2A.

Still yet, at operation 258, a second request for configuration data is received, from a second services gateway, at Step 258. The second request for configuration data may be received via a network. Moreover, based on a content of the second request, a second subset of stored configuration data associated with a second state is identified at Step 260. The second subset of stored configuration data that is associated with the second state may be identified in the manner previously described in the context of Steps 214-216 of the method (200) of FIG. 2A. Accordingly, the second state may be the state associated with configuration data that is visible to production services gateways, and therefore can be deployed to a production environment (i.e., the active state).

Further, at Step 262, the second subset of stored configuration data is sent to the second services gateway from which the request was received (at Step 258). The operations performed at Step 262 may be substantially identical to the operations performed at Step 216, as described in the context of the method (200) of FIG. 2A.

As an option, in accordance with one or more embodiments of the invention, the second state may be exclusive of the first state, such that no configuration data included in the second subset of the stored configuration data is included in the first subset of the stored configuration data. For example, if a given instance of configuration data is flagged as being in the active state, then that particular instance of configuration data may be prevented from also being in the edit state, or the pending or validated state. Similarly, if a given instance of configuration data is flagged as being in the edit state, then that particular instance of configuration data may be prevented from also being in the active state, or the pending or validated state. Still yet, if a given instance of configuration data is flagged as being in the pending or validated state, then that particular instance of configuration data may be prevented from also being in the edit state, or the active state.

Accordingly, by way of the method (250) described above, a single services registry server may provide configuration to two different services gateways that are operating in two different environments. For example, a single services registry server may store configuration data flagged as being in a pending or validated state, and provide the pending or validated configuration data to a first group of services gateways; as well as configuration data flagged with an active state, and provide the active configuration data to a second group of services gateways. After testing of an instance of configuration data has completed, the instance of configuration data may be made available to the second group of services gateways by transitioning the corresponding state flag to the active state.

Moreover, through the use of state flags, and by only allowing a given services gateway to have visibility into one state, control may be maintained over the version of configuration data that is processed by the services gateway, in accordance with one or more embodiments of the invention. For example, a services registry server hosting configuration data associated with various different states may, using state flags and a content of received requests, ensure that pre-production configuration data is only transmitted to a services gateway that has explicitly requested the pre-production configuration data. In this way, security and stability of customer-facing services gateways may be ensured, while also allowing for the flexible and rapid deployment of new configuration data by way of transitioning state flags.

Figure 2C:
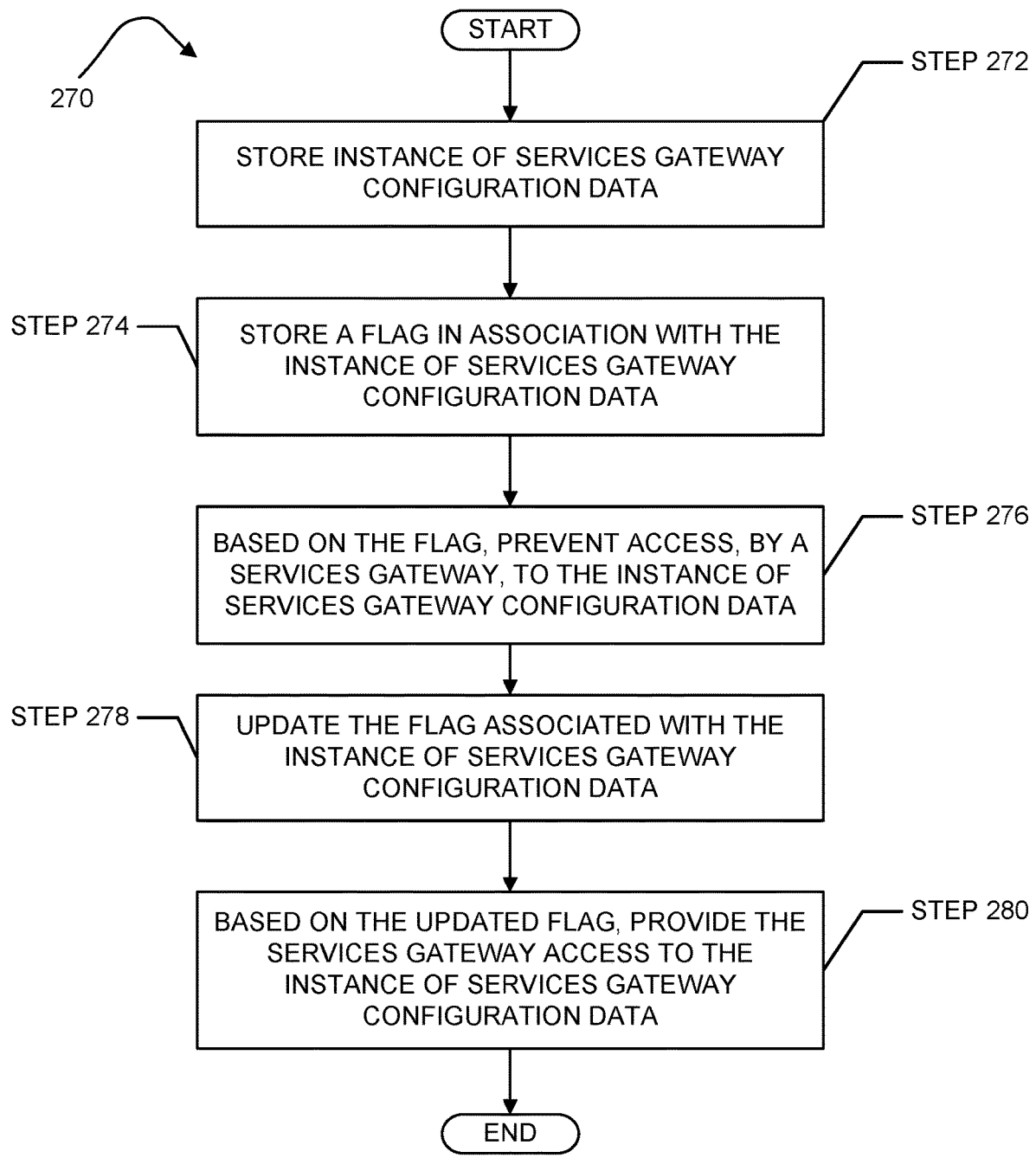

FIG. 2C depicts a flowchart of a method (270) for deploying configuration data as code, in accordance with one or more embodiments of the invention. In one or more embodiments, one or more of the steps shown in FIG. 2C may be omitted, repeated, and/or performed in a different order. Accordingly, embodiments of the invention should not be considered limited to the specific arrangements of steps shown in FIG. 2C. In one or more embodiments, the method (270) described in reference to FIG. 2C may be practiced using the services registry server (102) of the system (100) described in reference to FIGS. 1A-1B, above, and/or involving the computing system (400) described in reference to FIG. 4A.

At Step 272, an instance of services gateway configuration data is stored. Further, at Step at Step 274, a flag is stored in association with the instance of services gateway configuration data. In one or more embodiments, the flag indicates a state of the associated services gateway configuration data. As described above, the flag may indicate that the associated configuration data is in a first state. For example, the flag may indicate that associated configuration data is in an edit state, or in a pending or validated state.

At Step 276, based on the flag, access is prevented, by a services gateway, to the instance of the services gateway configuration data. In one or more embodiments, the services gateway may have requested all configuration data associated with a second state. For example, the services gateway may have request all configuration data associated with an active state. In one or more embodiments, the services gateway may have simply requested configuration data, without specifying a state of the configuration data. In such embodiments, where a services gateway fails to specify a state in its request for configuration data, then the services gateway is only returned configuration data in an active state. Accordingly, based on a content of the request from the services gateway, it is determined that the service gateway is requesting only configuration data in the active state, and access to any configuration data in the edit state, or in the pending or validated state is prevented.

Next, the flag previously stored at Step 274 is updated at Step 278. In one or more embodiments, the flag stored at Step 274 may have been a flag indicating an active state, a pending or validated state, or an edit state. Moreover, based on the updated flag, the services gateway is provided access to the instance of services gateway configuration data for which access was previously prevented (at Step 276). In other words, the flag set at Step 274 may indicate that the instance of configuration data is in a first state when the access to the services gateway configuration data is prevented, and, after the update to the flag, the flag may indicate a second state when the access to the instance of services gateway configuration data is provided.

In one or more embodiments, after the flag is updated, at Step 278, the services gateway may again send a request for configuration data to the services registry server. For example, the services gateway may be re-started. Because the instance of configuration data was transitioned to a different state, at Step 278, the services gateway may now be provided access to the instance of configuration data. For example, where the flag stored at Step 274 indicated that the instance of configuration data was in a pending or validated state, the updated flag (of Step 278) may indicate that the instance of configuration data is now in an active state.

Accordingly, with the update of the flag at Step 278, the state of the flag is changed to a new state. In one or more embodiments, the flag may be updated by an engineer manually changing the state of the flag, or by automated computer software. As an option, the flag may change states with the release of a new product or service. For example, after a new service or policy has been fully tested, configuration data of the service or policy may be transitioned to an active state, thereby causing the configuration data to be received by customer-facing production services gateways, and allow those gateways to offer the new service or policy to customers.

Figure 3:
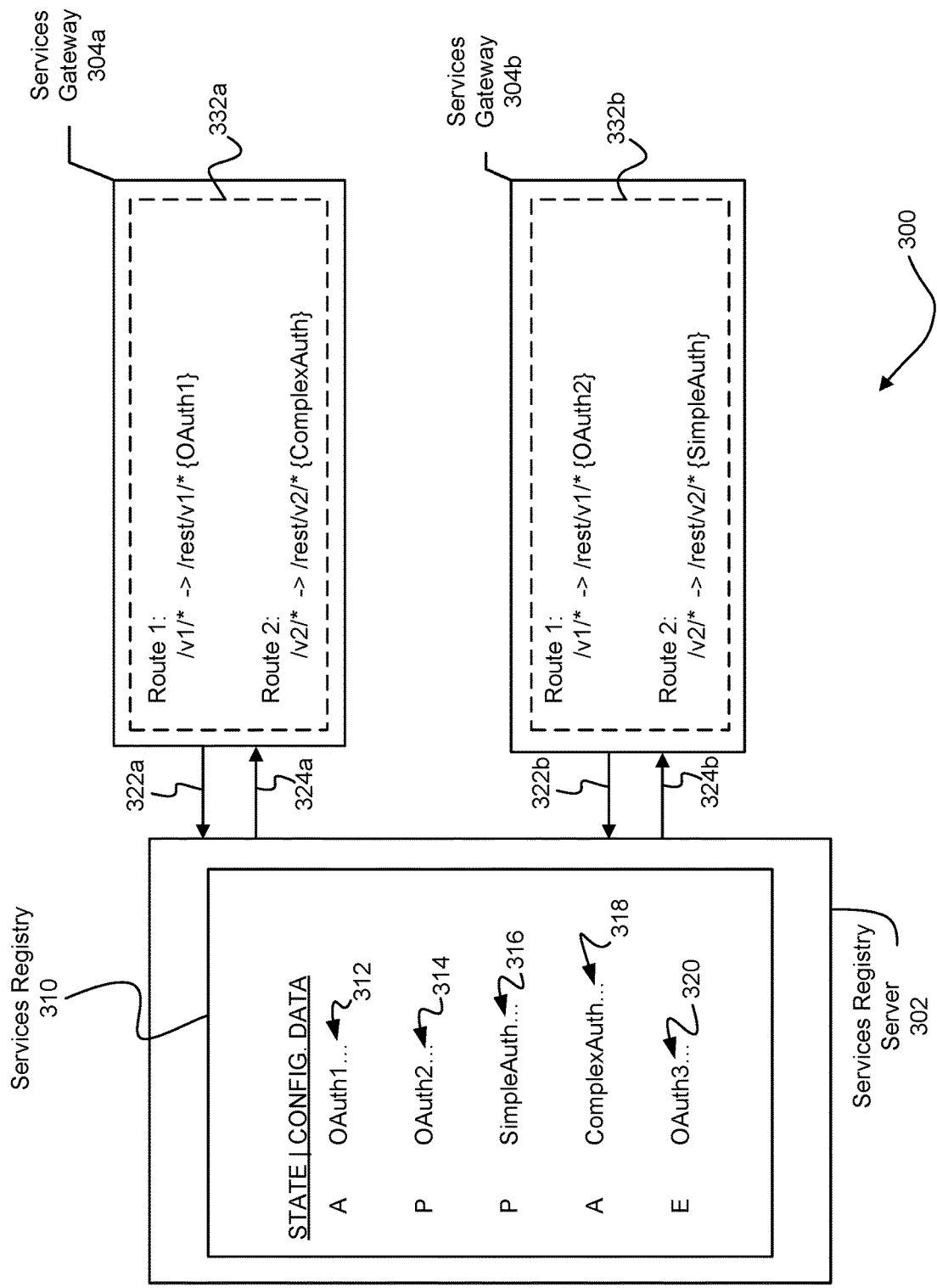
FIG. 3 shows an example of deploying configuration data as code, in accordance with one or more embodiments of the invention.

FIG. 3 illustrates a system (300) deploying configuration data as code, in accordance with one or more embodiments of the invention. The system (300) may operate in the context of the system (100) of FIGS. 1A and B, or the computing system (400) of FIG. 4A, and based on the methods described with respect to FIGS. 2A-2C, above.

As shown in FIG. 3, the system (300) includes a services registry server (302) in communication with a first services gateway (304a) and a second services gateway (304b). The services registry server (302) may be substantially identical to the services registry server (102) previously described in the context of FIGS. 1A and 1B. Similarly, the services gateways (304a, 304b) may be substantially identical to any of the services gateways (104) previously described in the context of FIGS. 1A and 1B.

As illustrated by FIG. 3, the services registry server (302) stores a services registry (310). Moreover, the services registry (310) is shown to include numerous instances of configuration data (312-320). Each instance of configuration data (312-320) may include data bindings and/or policy annotations. Further, each of the instances of configuration data (312-320) is associated with a state flag. In particular, the configuration data (312) for an OAuth1 policy is associated with a flag 'A,' the configuration data (314) for an OAuth2 policy is associated with a flag 'P,' the configuration data (316) for a SimpleAuth policy is associated with a flag 'P,' the configuration data (318) for a ComplexAuth policy is associated with a flag 'A,' and the configuration data (320) for an OAuth3 policy is associated with a flag 'E.' In the context of the present description, each 'A' flag may indicate that the associated configuration data is in an active state, each 'P' flag may indicate that the associated configuration data is in a pending or validated state, and each 'E' flag may indicate that the associated configuration data is in an edit state.

Turning to the services gateways (304), the first services gateway (304a) is shown to include a first routes pool (332a), and the second services gateway (304b) is shown to include a second routes pool (332b). The contents of the routes pools (332) may be configured based on configuration data received from the services registry (310) of the services registry server (302). In particular, the first services gateway (304a) may send a first request (322a) to the services registry server (302), thereby requesting configuration data for configuring routes, policies, services, etc. of the first services gateway (304a). Similarly, the second services gateway (304b) may send a second request (322b) to the services registry server (302), thereby requesting configuration data for configuring routes, policies, services, etc. of the second services gateway (304b)

The first services gateway (304a) may identify, in the first request (322a), that it is attempting to retrieve configuration data that is active. As an option, the first services gateway (304a) may omit any reference to a state in the first request (322a), or it may specify in the first request (322a) a state that is unrecognized by the services registry server (302). As a result, and as described below, the first services gateway (304a) will receive in response to the first request (322a) active configuration data.

In its first response (324a) to the first request (322a), the services registry server (302) provides the first services gateway (304a) a first subset of the configuration data (312-320) based on a content of the first request (322a) and the state flags associated with the configuration data (312-320). For example, the services registry server (302) may filter contents of the services registry (310) for all active configuration data. The first services gateway (304a) receives from the services registry server (302) a subset of configuration data including all configuration data in the active state. Moreover, based on the first subset of configuration data received in the first response (324a), the first services gateway (304a) configures two routes.

Specifically, based on the first subset of configuration data received in the first response (324a), the first services gateway (304a) has configured a first route such that the first route is used for all v1 REpresentational State Transfer (REST) web services on the first services gateway (304a), and further bound the active OAuth1 policy to all v1 services (i.e., "/v1/*"). Also, based on the first subset of configuration data received in the first response (324a), the first services gateway (304a) has configured a second route such that the second route is used for all v2 REST web services on the first services gateway (304a), and further bound the active ComplexAuth policy to all v2 services (i.e., "/v2/*").

In its second response (324b) to the second request (322b), the services registry server (302) provides the second services gateway (304b) a second subset of the configuration data (312-320) based on a content of the second request (322b) and the state flags associated with the configuration data (312-320). In particular, the second services gateway (304b) receives from the services registry server (302) a subset of configuration data including all configuration data in the pending or validated state. Moreover, based on the second subset of configuration data received in the second response (324*b*), the second services gateway (304*b*) configures two routes.

Specifically, based on the second subset of configuration data received in the second response (324*b*), the second services gateway (304*b*) has configured a first route such that the first route is used for all v1 REST web services on the second services gateway (304*b*), and further bound the pending or validated OAuth2 policy to all v1 services (i.e., "/v1/*"). Also, based on the second subset of configuration data received in the second response (324*b*), the second services gateway (304*b*) has configured a second route such that the second route is used for all v2 REST web services on the second services gateway (304*b*), and further bound the pending or validated SimpleAuth policy to all v2 services (i.e., "/v2/*").

In this manner, the deployment of configuration data as code described hereinabove provides a single services registry with the ability to serve both production and pre-production (i.e., testing, etc.) environments, without interfering with each other or the operation of the services registry. As a result, quality assurance engineers and other testers may be able to test APIs and services in production, without the APIs and services actually being fully available to customers and their traffic. Moreover, as described herein, the services registry provides a rapid way to transition a given instance of configuration data between states. As an option, the configuration data may be versioned so that it can be rolled back a previously-known error-free version if any issues are found. Also, the single services registry may allow a services gateway to have one or more substitutes for all configuration data across production and pre-production.

Figure 4A:
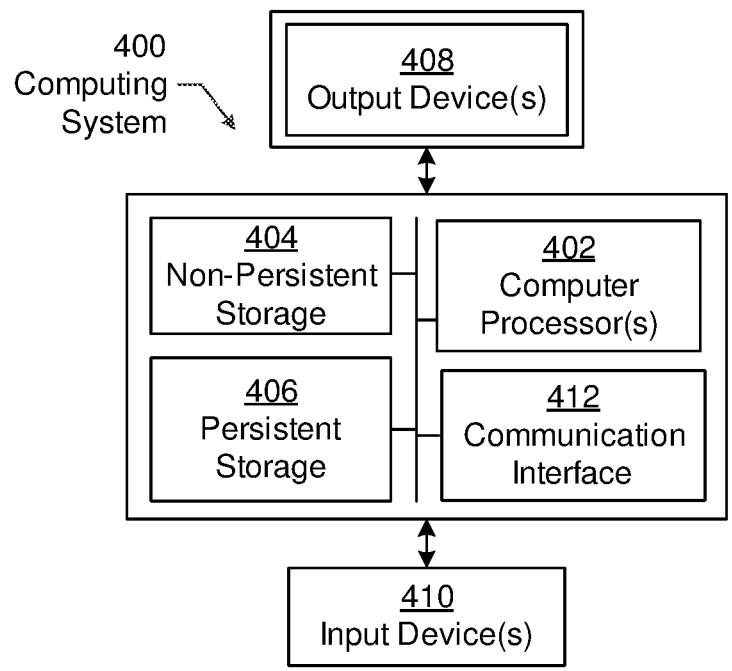
FIG. 4A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
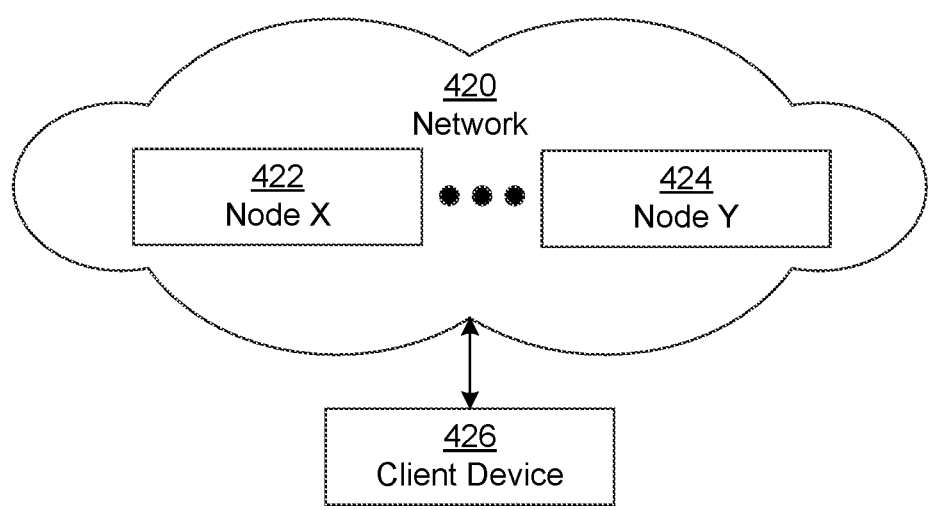
FIG. 4B shows a group of computing systems, in accordance with one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for providing services gateway configuration data, comprising:
    receiving, by a single registry and from a first services gateway, a first request for configuration data;
    identifying, by the single registry, a first subset of stored configuration data that is responsive to the first request,
        wherein the first subset of the stored configuration data is identified using a content of the first request and a first state of the first subset of the stored configuration data,
        wherein the first state of the first subset of the stored configuration data is configured using a first flag that is associated with the first subset of the stored configuration data, and
        wherein the first flag may be set by selecting a first value from one or more pre-determined values that are each representative of a different state;
    sending, to the first services gateway, the first subset of the stored configuration data;
    receiving, from a second services gateway, a second request for configuration data;
    identifying, by the single registry, a second subset of the stored configuration data that is responsive to the second request,
        wherein the second subset of the stored configuration data is identified using a content of the second request and a second state associated with the second subset of the stored configuration data,
        wherein the second state of the second subset of the stored configuration data is configured using a second flag that is associated with the second subset of the stored configuration data,
        wherein the second flag may be set by selecting a second value from the one or more pre-determined values; and
    sending, to the second services gateway, the second subset of the stored configuration data.

2. The method of claim 1, wherein the content of the first request does not identify a state of the requested configuration data.

3. The method of claim 1, wherein the content of the second request identifies the second state.

4. The method of claim 3, wherein the second state is exclusive of the first state, such that no configuration data included in the second subset of the stored configuration data is included in the first subset of the stored configuration data.

5. A system for providing services gateway configuration data, comprising:
    a hardware processor and memory; and
    a single registry executing on the hardware processor and configured to:
        receive, from a first services gateway, a first request for configuration data;
        identify a first subset of stored configuration data that is responsive to the first request,
            wherein the first subset of the stored configuration data is identified using a content of the first request and a first state of the first subset of the stored configuration data,
            wherein the first state of the first subset of the stored configuration data is configured using a first flag that is associated with the first subset of the stored configuration data, and
            wherein the first flag may be set by selecting a first value from one or more pre-determined values that are each representative of a different state;
        send, to the first services gateway, the first subset of the stored configuration data;
        receive, from a second services gateway, a second request for configuration data;
        identify a second subset of the stored configuration data that is responsive to the second request,
            wherein the second subset of the stored configuration data is identified using a content of the second request and a second state associated with the second subset of the stored configuration data,
            wherein the second state of the second subset of the stored configuration data is configured using a second flag that is associated with the second subset of the stored configuration data,
            wherein the second flag may be set by selecting a second value from the one or more pre-determined values; and
        send, to the second services gateway, the second subset of the stored configuration data.

6. The system of claim 5, wherein the content of the first request does not identify a state of the requested configuration data.

7. The system of claim 5, wherein the content of the second request identifies the second state.

8. The system of claim 7, wherein the second state is exclusive of the first state, such that no configuration data included in the second subset of the stored configuration data is included in the first subset of the stored configuration data.

* * * * *